(12) United States Patent
Glassford et al.

(10) Patent No.: US 12,384,706 B2
(45) Date of Patent: Aug. 12, 2025

(54) HIGH-EFFICIENCY AIRLIFT PUMP

(71) Applicant: GIS Gas Infusion Systems Inc., Saint Andrews (CA)

(72) Inventors: David Glassford, Saint Andrews (CA); Mike Beattie, Saint Andrews (CA)

(73) Assignee: GIS Gas Infusion Systems Inc., Saint Andrews (CA)

( * ) Notice: Subject to any disclaimer, the term of this patent is extended or adjusted under 35 U.S.C. 154(b) by 0 days.

(21) Appl. No.: 18/453,281

(22) Filed: Aug. 21, 2023

(65) Prior Publication Data

US 2023/0416125 A1 Dec. 28, 2023

Related U.S. Application Data

(62) Division of application No. 16/955,967, filed as application No. PCT/CA2018/051624 on Dec. 19, 2018, now abandoned.
(Continued)

(51) Int. Cl.
*C02F 3/22* (2023.01)
*B01F 23/232* (2022.01)
(Continued)

(52) U.S. Cl.
CPC ...... *C02F 3/223* (2013.01); *B01F 23/232311* (2022.01); *B01F 23/803* (2022.01);
(Continued)

(58) Field of Classification Search
CPC ...... C02F 3/223; C02F 3/201; C02F 2103/20; C02F 1/20; B01F 23/232311;
(Continued)

(56) References Cited

U.S. PATENT DOCUMENTS 3,917,763 A 11/1975 Schafer
4,144,841 A 3/1979 Bliss et al.
(Continued)

FOREIGN PATENT DOCUMENTS

CA 2630328 A1 11/2009
CA 2796043 A1 10/2011
(Continued)

OTHER PUBLICATIONS

"International Search Report for PCT/CA2018/051624 dated Apr. 18, 2019", Apr. 18, 2019.
(Continued)

*Primary Examiner* — Ekandra S. Miller-Cruz
(74) *Attorney, Agent, or Firm* — S.J. Intellectual Property LTD.

(57) ABSTRACT

This document describes a gas streaming device for use between an injection port and a mixing chamber within an airlift pump, and an airlift pump with the gas streaming device. The gas streaming device includes a planar plate with multiple holes extending therethrough, where the holes are dimensioned to direct the gas into multiple microstreams for streaming air from the injection port into the mixing chamber. An airlift pump in combination with such a gas streaming device is useful for removing anomalously high concentrations of dissolved gas in a liquid. The increased efficiency for this invention may also enable this type of pump to be economic in other applications where it is desirable to lift a liquid or induce flow.

17 Claims, 23 Drawing Sheets

Related U.S. Application Data

(60) Provisional application No. 62/608,672, filed on Dec. 21, 2017, provisional application No. 62/607,385, filed on Dec. 19, 2017.

(51) Int. Cl.
  *B01F 23/80* (2022.01)
  *C02F 3/20* (2023.01)
  *C02F 103/20* (2006.01)
  *F04F 1/20* (2006.01)
  *F04F 5/24* (2006.01)

(52) U.S. Cl.
  CPC ............... *C02F 3/201* (2013.01); *F04F 1/20* (2013.01); *F04F 5/24* (2013.01); *C02F 2103/20* (2013.01)

(58) Field of Classification Search
  CPC ..... B01F 23/803; B01F 23/23121; F04F 1/20; F04F 5/24; F04F 1/18; F04F 5/465; Y02W 10/10
  USPC ........................................................ 210/620
  See application file for complete search history.

(56) References Cited

U.S. PATENT DOCUMENTS

| | | |
|---|---|---|
| 5,139,668 A | 8/1992 | Pan et al. |
| 5,217,617 A | 6/1993 | Duncan et al. |
| 5,242,643 A | 9/1993 | Kim et al. |
| 5,322,622 A | 6/1994 | Chiang |
| 5,480,593 A | 1/1996 | Marcum et al. |
| 5,947,058 A | 9/1999 | Chen |
| 7,537,200 B2 | 5/2009 | Glassford |
| 8,678,356 B2 * | 3/2014 | Iwaki ................ B01F 23/23341 261/87 |
| 2003/0010690 A1 | 1/2003 | Okajima et al. |
| 2003/0127389 A1 | 7/2003 | Rabie et al. |
| 2010/0139871 A1 | 6/2010 | Rasmussen et al. |
| 2013/0259774 A1 | 10/2013 | Narushima et al. |

FOREIGN PATENT DOCUMENTS

| | | |
|---|---|---|
| CN | 205962403 U | 2/2017 |
| DE | 4243424 A1 | 6/1994 |
| JP | S61-218800 | 9/1986 |
| JP | H084700 A | 1/1996 |
| JP | H08-089130 | 4/1996 |
| JP | 11-000078 | 1/1999 |
| JP | 2005144425 A | 6/2005 |
| JP | 2008114174 A | 5/2008 |
| JP | 5296646 B2 | 6/2013 |
| JP | 2016083630 A | 5/2016 |
| JP | 2016113845 A | 6/2016 |
| NL | 1018703 C2 | 2/2003 |

OTHER PUBLICATIONS

"Supplementary European Search Report for European Patent Application No. 18891422 dated May 21, 2021".

* cited by examiner

FIGURE 5
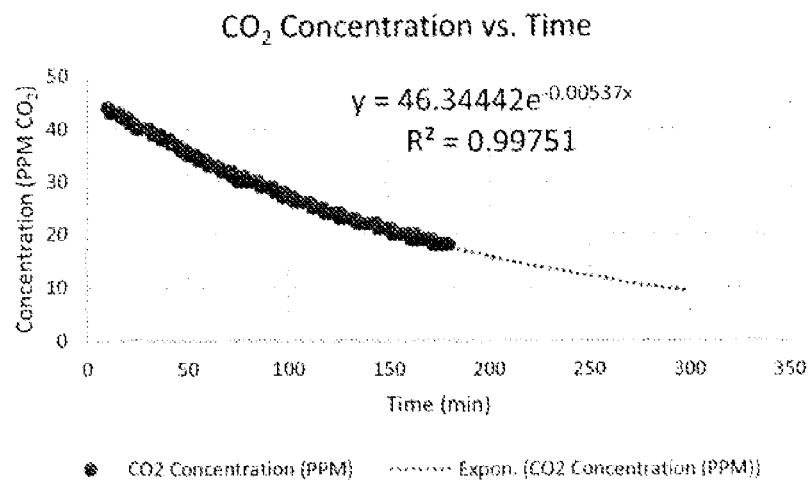
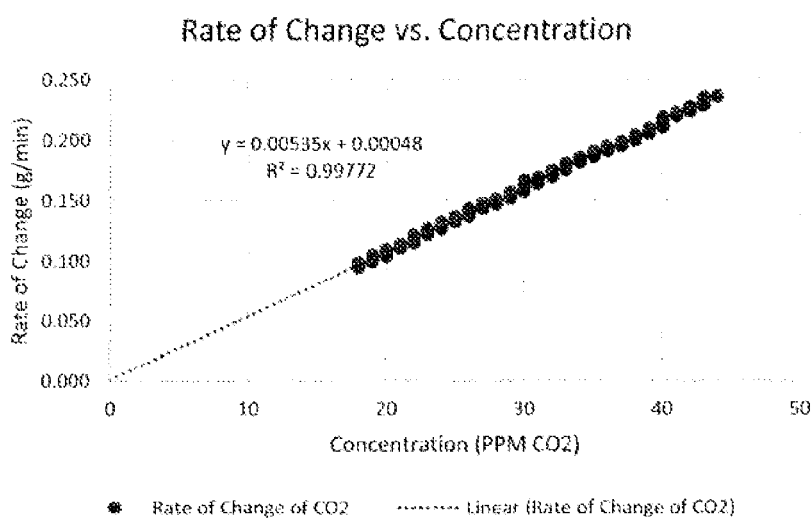
| 4 inch lift | 29-May-17 | Lake Utopia |
|---|---|---|
| Disk Type 1 | LPM Water | 200 |
| 1 Lift | Lift Hight | 4 Feet |
| 10 deg C | LPM Gas | 50 |
| | Act. Gas | 58.25 |
| | PSI Gas | 5.25 |
| | W/G Ratio | 3.43 |
| | Tank Volume ($M^3$) | 5 |
| | Tank % turnover/min | 4.0% |
| | % Removal | 12.3% |

FIGURE 6
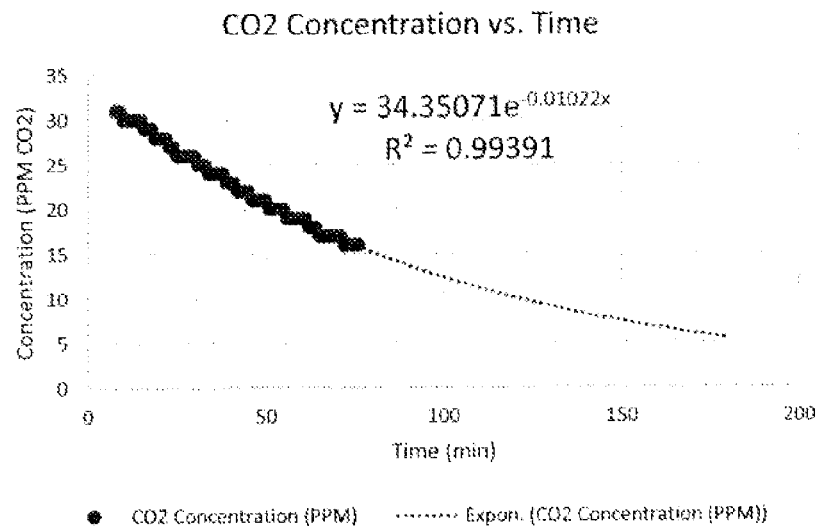
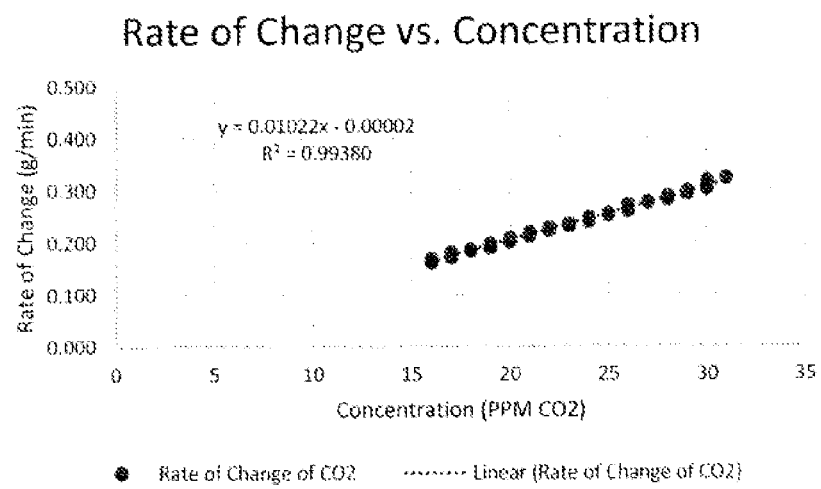
| 4 inch lift | 1-Jun-17 | Lake Utopia |
|---|---|---|
| Disk Type 1 | LPM Water | 300 |
| 1 Lift | Lift Hight | 4 Feet |
| 15 deg C | LPM Gas | 80 |
| | Act. Gas | 101.7934416 |
| | PSI Gas | 9.1 |
| | W/G Ratio | 2.94714468 |
| | Tank Volume ($M^3$) | 5 |
| | Tank % turnover/min | 6.0% |
| | % Removal | 16.2% |

FIGURE 7
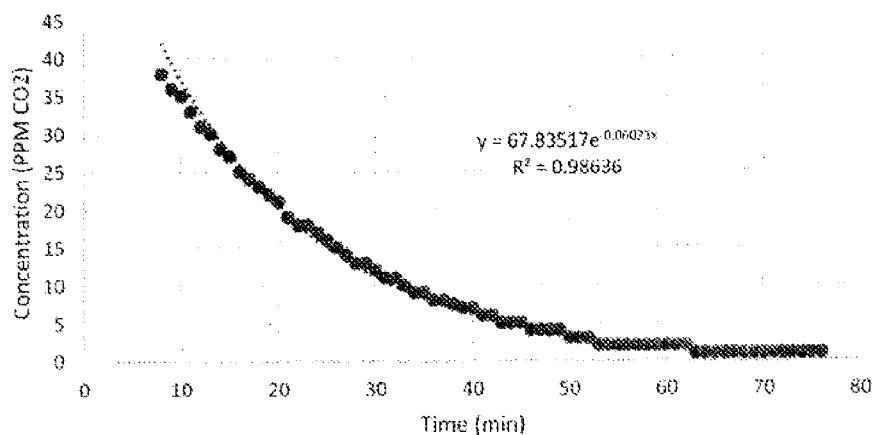
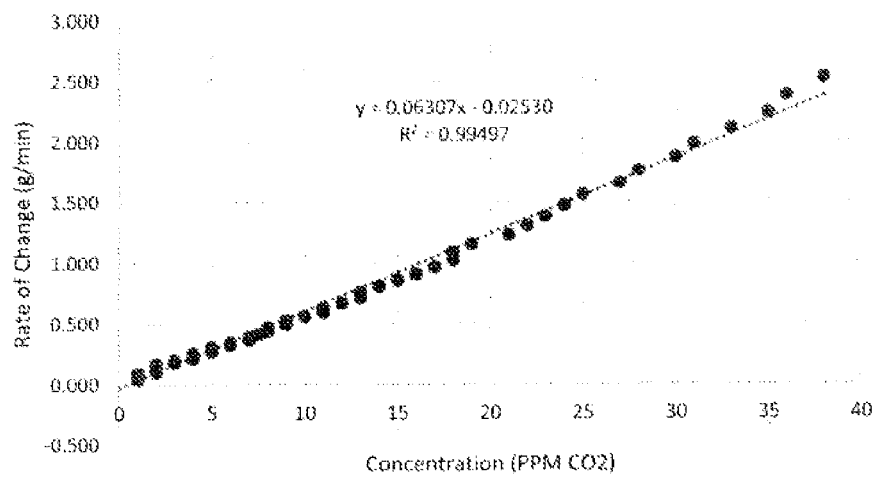
| 4 inch lift | 18-May-17 | Huntsman |
|---|---|---|
| Disk Type 1 | LPM Water | 400 |
| 2 Lift | Lift Hight | 3 Feet |
| 10 deg C | LPM Gas | 100 |
| | Act. Gas | 109.7306535 |
| | PSI Gas | 3 |
| | W/G Ratio | 3.645289507 |
| | Tank volume (M³) | 0.3 |
| | Tank % turnover/min | 133.3% |
| | % Removal | 18.3% |

FIGURE 9
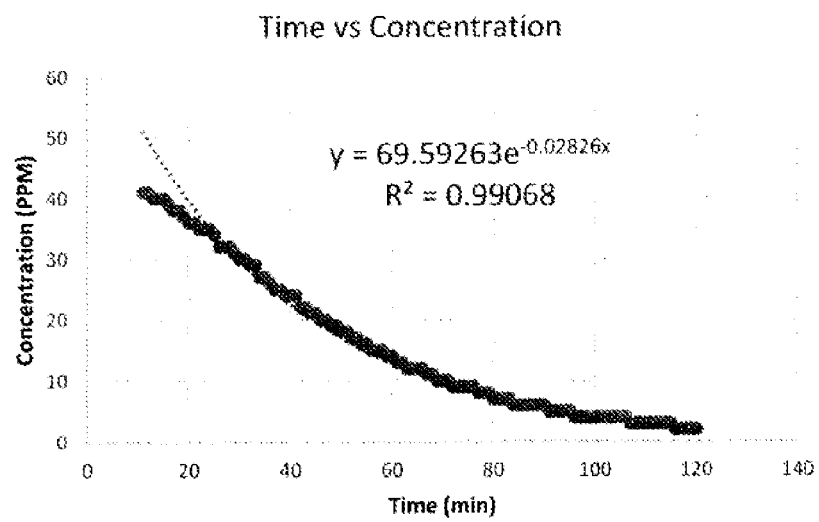
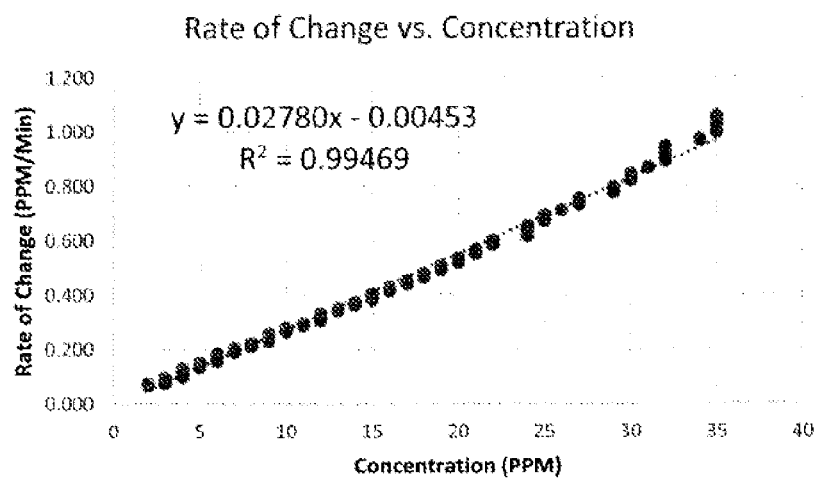
| 4 inch lift | 17-May-17 | inVentures |
|---|---|---|
| Disk Type 1 | LPM Water | 80 |
| 1 Lift | Lift Hight | 3 Feet |
| 13 deg C | LPM Gas | 40 |
| | Act. Gas | 43.9 |
| | PSI Gas | 3 |
| | W/G Ratio | 1.82 |
| | Tank volume (M³) | 0.8 |
| | Tank % turnover/min | 10% |
| | % Removal | 25.8% |

FIGURE 10
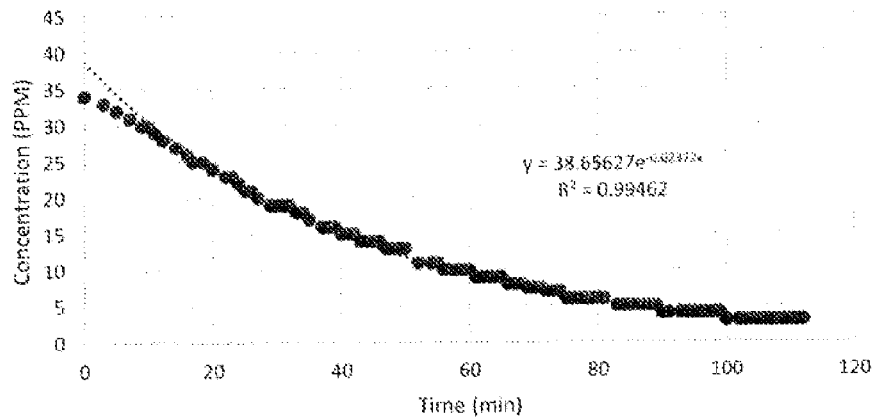
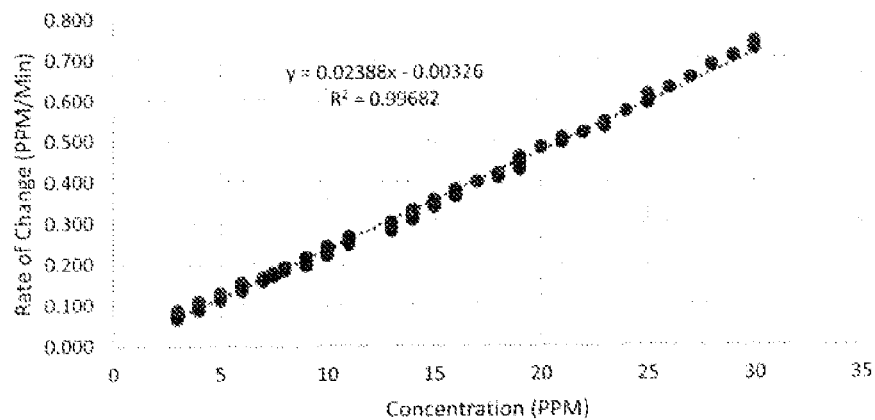
| 4 inch lift | 18-May-17 | Huntsman |
|---|---|---|
| Disk Type 1 | LPM Water | 160 |
| 1 Lift | Lift Hight | 3 Feet |
| 15 deg C | LPM Gas | 80 |
| | Act. Gas | 87.8 |
| | PSI Gas | 8 |
| | W/G Ratio | 1.82 |
| | Tank volume (M³) | 1.6 |
| | Tank % turnover/min | 10.0% |
| | % Removal | 16.9% |

FIGURE 11
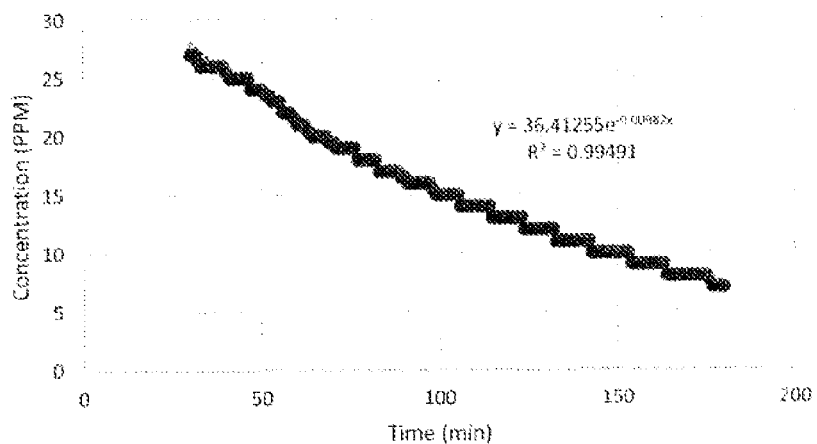
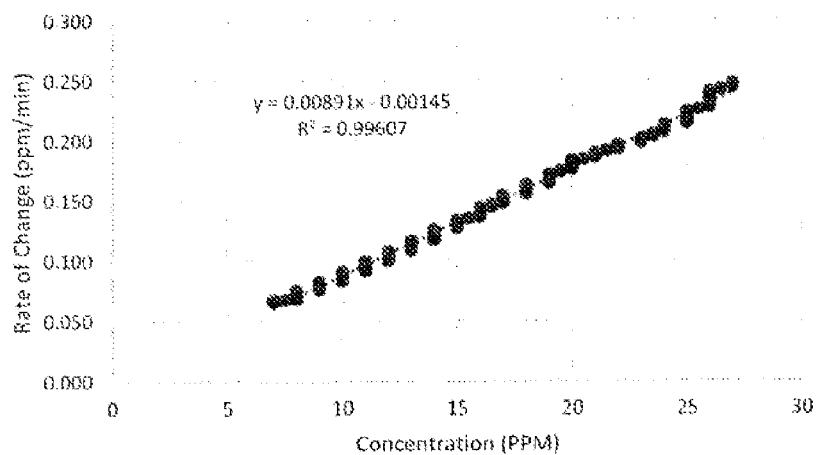
| 4 inch lift | 24-Jul-17 | Huntsman |
|---|---|---|
| Disk Type 1 | LPM Water | 300 |
| 1 Lift | Lift Hight | 6 Feet |
| 14 deg C | LPM Gas | 80 |
| | Act. Gas | 99.4 |
| | PSI Gas | 8 |
| | Tank size ($M^3$) | 8.5 |
| | W/G Ratio | 3.02 |
| | Tank % turnover/min | 3.5% |
| | % Removal | 20.8% |

FIGURE 13
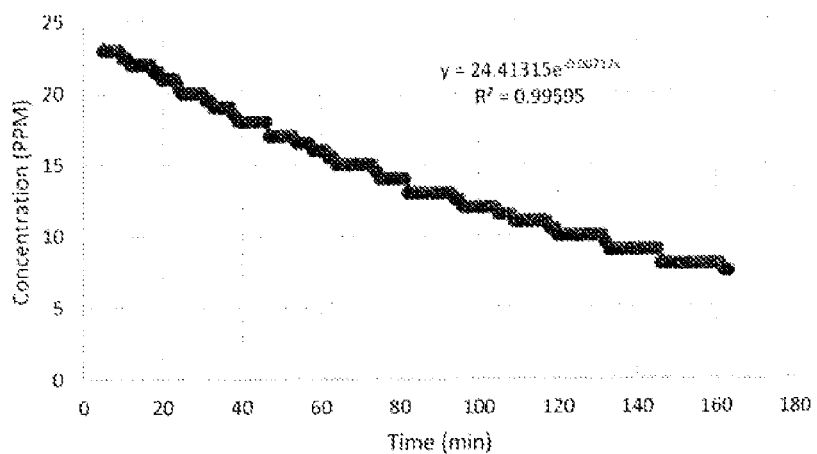
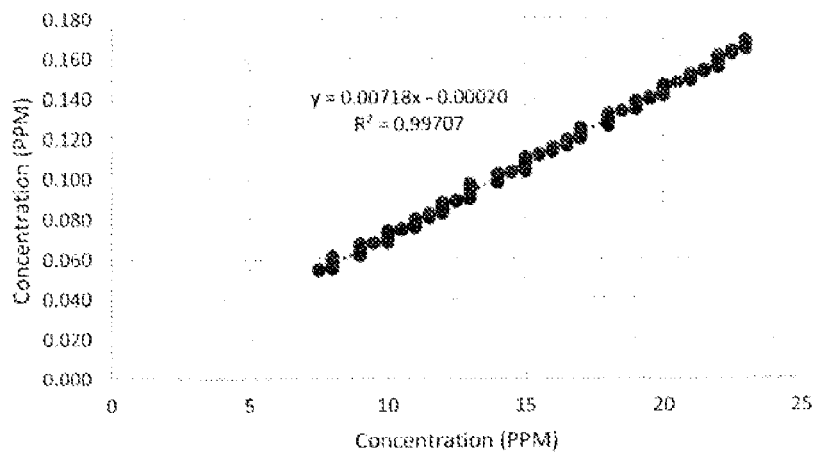
| 4 inch lift | 4-Aug-17 | Huntsman |
|---|---|---|
| Disk Type 1 | LPM Water | 236 |
| 1 Lift | Lift Hight | 6 Feet |
| 16 deg C | LPM Gas | 80 |
| | Act. Gas | 87.8 |
| | PSI Gas | 8 |
| | Tank size ($M^3$) | 8.8 |
| | W/G Ratio | 2.69 |
| | Tank % turnover/min | 2.7% |
| | % Removal | 22.9% |

FIGURE 14
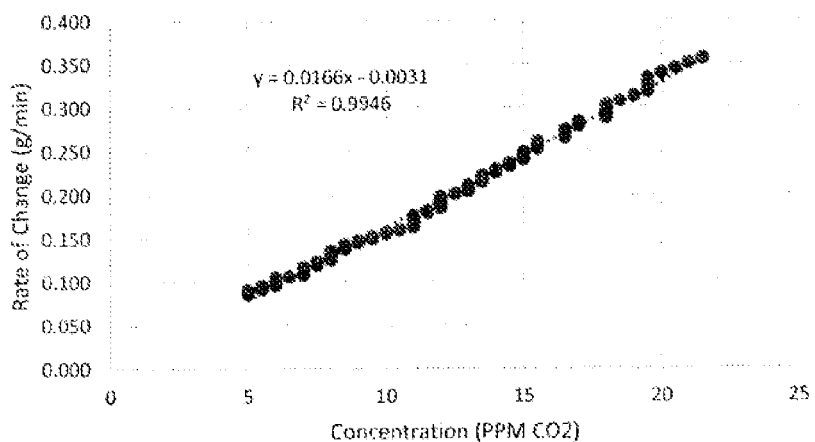
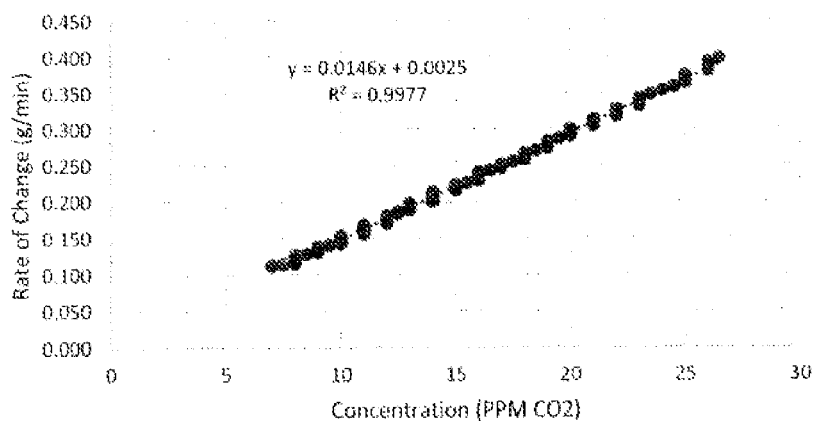
| 6 inch lift | 30/8/2017 | Huntsman |
|---|---|---|
| Disk Type 1 | LPM Water | 600 |
| 1 Lift | Lift Hight | 6 Feet |
| 16 deg C | LPM Gas | 210 |
| | Act. Gas | 230.4 |
| | PSI Gas | 3 |
| | Tank size ($M^3$) | 8.8 |
| | W/G Ratio | 2.60 |
| | Tank % turnover/min | 6.8% |
| | % Removal | 22.3% |

FIGURE 15
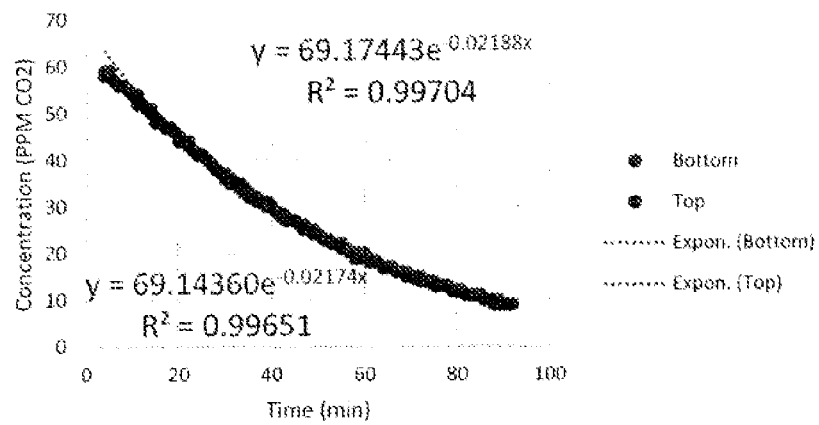
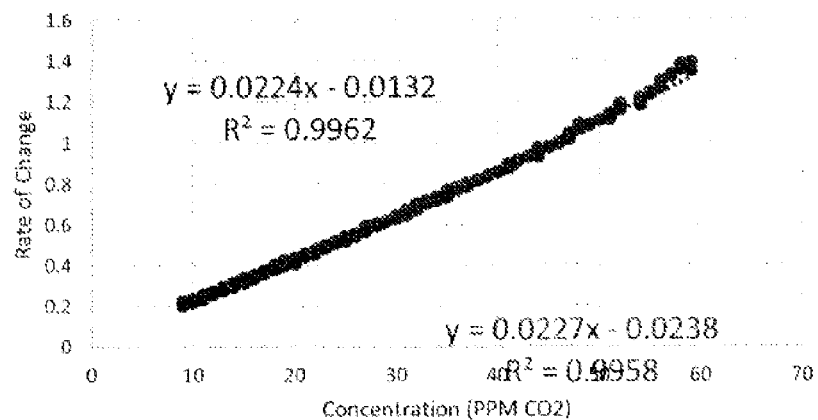
| 6 inch lift | 15-Jan-18 | Quoddy |
|---|---|---|
| Disk Type 2 | LPM Water | 1100 |
| 1 Lift | Lift Hight | 6 Feet |
| ~4 deg C or less | LPM Gas | 1274.4 |
|  | Act. Gas | 1368.46 |
|  | PSI Gas | 4 |
|  | Tank size | 8.8 |
|  | W/G Ratio | 0.804 |
|  | Tank % turnover/min | 12.4% |
|  | % Removal | 16.4% |

FIGURE 18
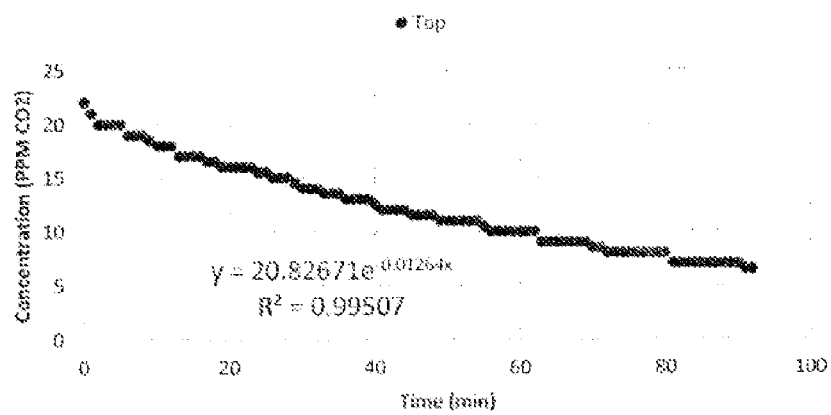
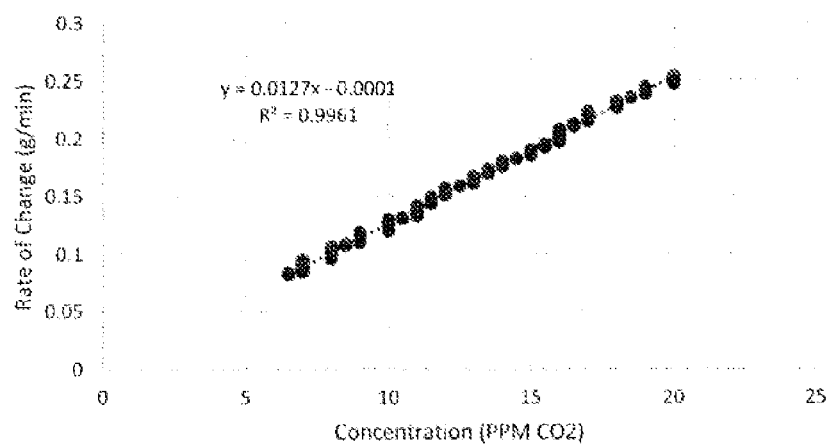
| 6 inch lift | 11-Dec-17 | Quoddy |
|---|---|---|
| Disk Type 1 | LPM Water | 600 |
| 1 Lift | Lift Hight | 6 Feet |
| 5.5 deg C | LPM Gas | 210 |
| | Act. Gas | 238.4 |
| | PSI Gas | 4.25 |
| | Tank size | 8.8 |
| | W/G Ratio | 2.52 |
| | Tank % turnover/min | 6.8% |
| | % Removal | 17.0% |

FIGURE 19
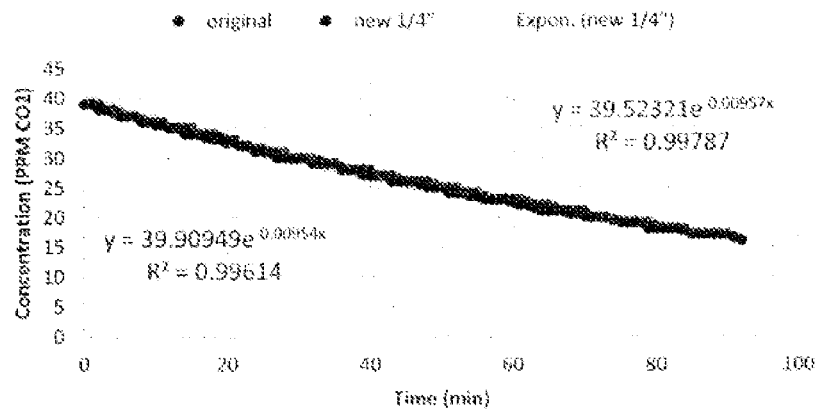
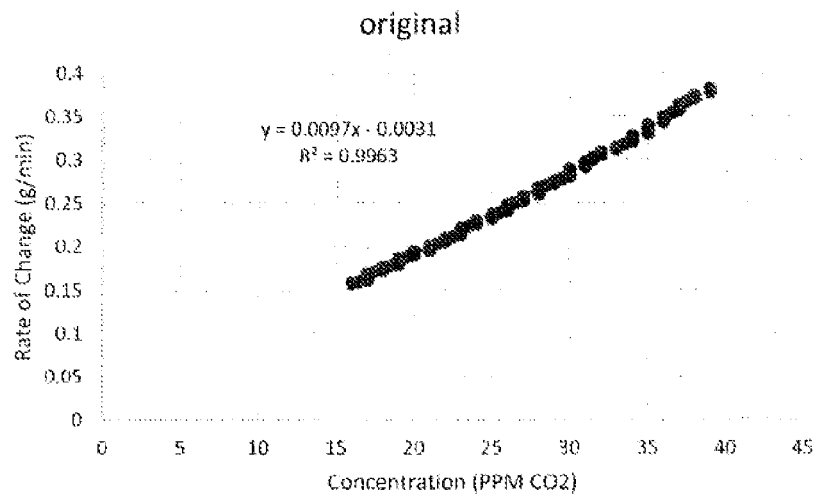
| 6 inch lift | 12-Dec-17 | Quoddy |
|---|---|---|
| 1 Lift | LPM Water | 550 |
| Disk Type 1 | Lift Hight | 6 Feet |
| Disk Type 2 | LPM Gas | 175 |
| ~5 deg C or less | Act. Gas | 197.4 |
| | PSI Gas | 4 |
| | Tank size | 8.8 |
| | W/G Ratio | 2.79 |
| | Tank % turnover/min | 6.2% |
| | % Removal | 14.4% |

FIGURE 20
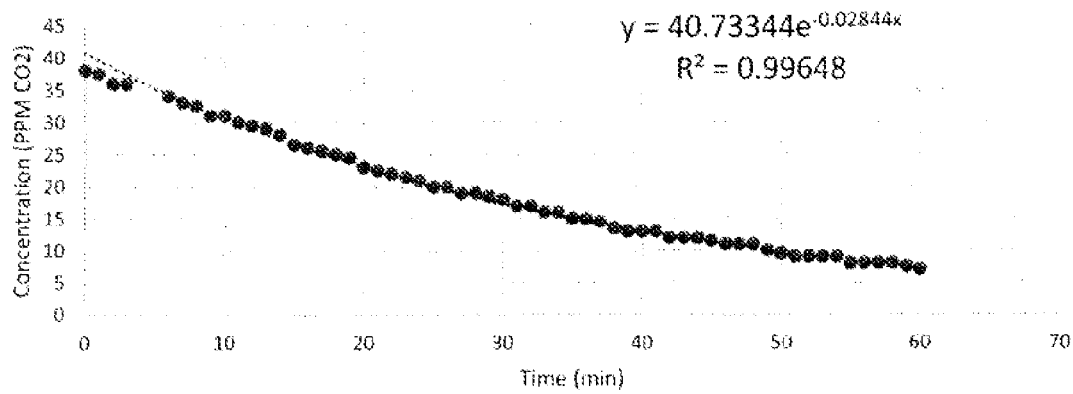
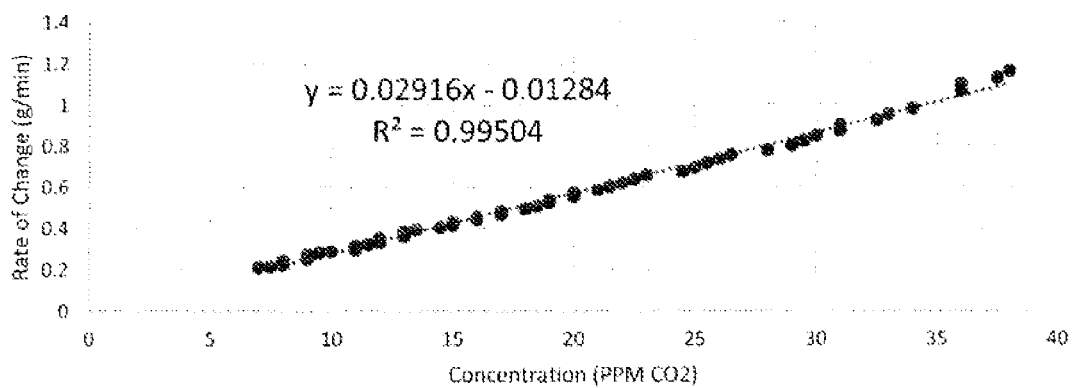
| 6 inch lift | 13-Dec-17 | Quoddy |
|---|---|---|
| Disk Type 2 | LPM Water | 1200 |
| 1 Lift | Lift Hight | 6 Feet |
| ~4 deg C or less | LPM Gas | 1557.6 |
| | Act. Gas | 1647.7 |
| | PSI Gas | 4 |
| | Tank size | 8.8 |
| | W/G Ratio | 0.729 |
| | Tank % turnover/min | 13.6% |
| | % Removal | 20.1% |

FIGURE 21
CO2 Concentration vs. Time
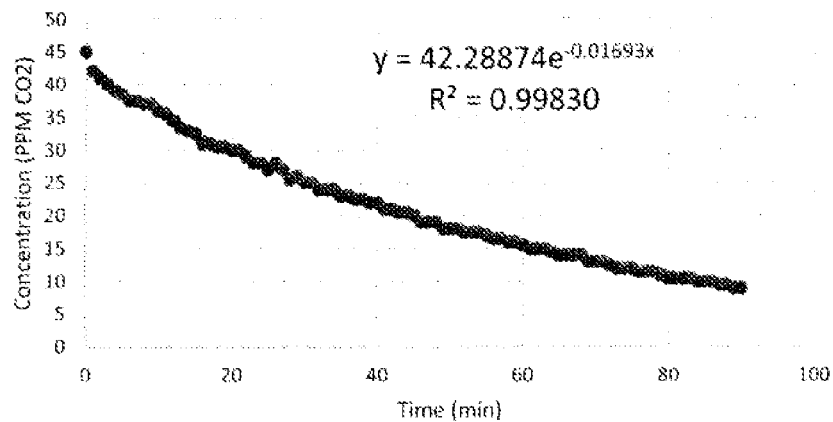
$y = 42.28874e^{-0.01693x}$
$R^2 = 0.99830$
Rate of Change vs. Concentration
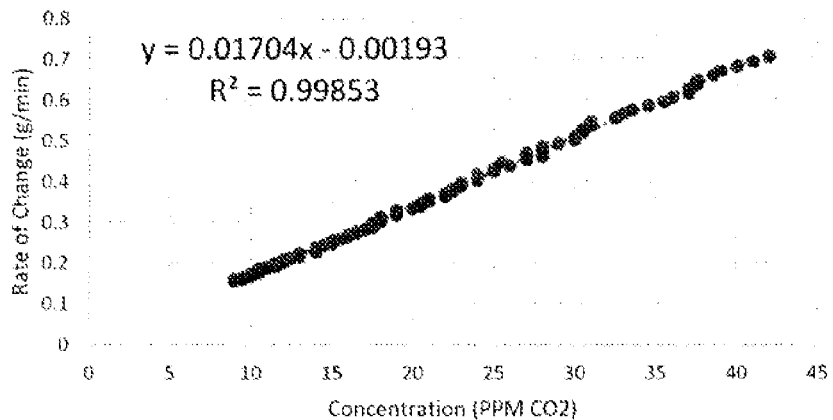
$y = 0.01704x - 0.00193$
$R^2 = 0.99853$
| 6 inch lift | 13-Dec-17 | Quoddy |
|---|---|---|
| Disk Type 2 | LPM Water | 1000 |
| 1 Lift | Lift Hight | 6 Feet |
| ~4 deg C or less | LPM Gas | 849.6 |
|  | Act. Gas | 921.7 |
|  | PSI Gas | 4 |
|  | Tank size | 8.8 |
|  | W/G Ratio | 1.086 |
|  | Tank % turnover/min | 11.3% |
|  | % Removal | 14.9% |

FIGURE 22
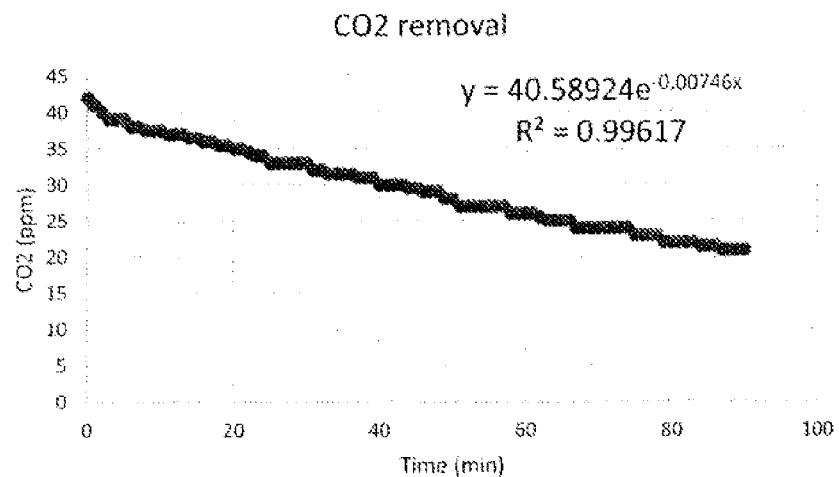
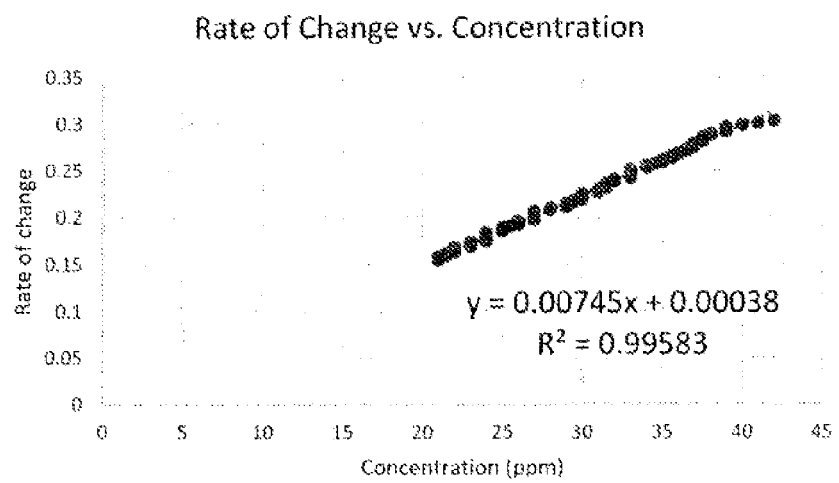
| 6 inch lift | 15-Jan-18 | Quoddy |
|---|---|---|
| Disk Type 2 | LPM Water | 900 |
| 1 Lift | Lift Hight | 6 Feet |
| ~4 deg C or less | LPM Gas | 424.8 |
| | Act. Gas | 460.8 |
| | PSI Gas | 4 |
| | Tank size | 8.8 |
| | W/G Ratio | 1.957 |
| | Tank % turnover/min | 10.2% |
| | % Removal | 7.2% |

FIGURE 23

| 6 inch lift | 22-Aug-18 | Quoddy |
|---|---|---|
| Disk Type 3 | LPM Water | 700 |
| 1 Lift | Lift Hight | 6 Feet |
| 24 deg C | LPM Gas | 220 |
| | Act. Gas | 249.1 |
| | PSI Gas | 4 |
| | Tank size | 9.2 |
| | W/G Ratio | 2.79 |
| | Tank % turnover/min | 7.5% |
| | % Removal | 20.6% |

FIGURE 24

| 6 inch lift | 30-Aug-18 | Quoddy |
|---|---|---|
| Disk Type 4 | LPM Water | 561 |
| 1 Lift | Lift Hight | 6 Feet |
| 26.8 deg C | LPM Gas | 220 |
| | Act. Gas | 243.8 |
| | PSI Gas | 3.2 |
| | Tank size | 9.2 |
| | W/G Ratio | 2.3 |
| | Tank % turnover/min | 6.1% |
| | % Removal | 27.3% |

FIGURE 25

| 6 inch lift | 24-Sept-18 | Quoddy |
|---|---|---|
| Disk Type 4 | LPM Water | 641 |
| 1 Lift | Lift Hight | 6 Feet |
| 18.5 deg C | LPM Gas | 220 |
| | Act. Gas | 243.8 |
| | PSI Gas | 3.2 |
| | Tank size | 9.2 |
| | W/G Ratio | 2.63 |
| | Tank % turnover/min | 7.0% |
| | % Removal | 22.0% |

FIGURE 26

| 6 inch lift | 25-Sept-18 | Quoddy |
|---|---|---|
| Disk Type 5 | LPM Water | 526 |
| 1 Lift | Lift Hight | 6 Feet |
| 18.5 deg C | LPM Gas | 231 |
| | Act. Gas | 247.5 |
| | PSI Gas | 2.2 |
| | Tank size | 9.2 |
| | W/G Ratio | 2.13 |
| | Tank % turnover/min | 5.7% |
| | % Removal | 25.6% |

HIGH-EFFICIENCY AIRLIFT PUMP

CROSS-REFERENCE TO RELATED APPLICATIONS

This application claims priority to and is a divisional of U.S. patent application Ser. No. 16/955,967 filed Jun. 19, 2020, which is a 371 National Phase Entry of PCT Patent Application No. PCT/CA2018/051624 filed Dec. 19, 2018, which claims the benefit of and priority to U.S. Provisional Patent Application No. 62/607,385 filed Dec. 19, 2017, and U.S. Provisional Patent Application No. 62/608,672 filed Dec. 21, 2017, and incorporates the foregoing applications by reference in their entirety into this document as if fully set out at this point.

TECHNICAL FIELD

The invention relates generally to air-lift pumps and, more particularly, to vertically orientated lift pumps for the recirculation of fluid in aquaculture systems.

BACKGROUND

Air-lift pumps are self-contained liquid transport devices capable of moving large quantities of water. They are mechanical devices that are usually vertically oriented in the form of a tube or pipe, where the lower portion of the tube is immersed in a liquid medium. The submerged pipe is fitted with an air injection source near the bottom submerged end.

As water enters the tube from the bottom portion, gas is simultaneously streamed into the liquid. The injection of the gas may be done via a commercial product known as an air-stone. This injection of gas causes the density of the water to drop, which causes the water to rise within the tube. This then enables or draws other water to enter the tube from the bottom end. In other words, the specific gravity of the gas/water mixture lowers, causing the gas/water mixture to rise through the tube and the "heavier" water takes its place at the bottom of the tube before it is also injected with gas. As less-dense water rises in the tube above the water-line level of the tank outside the vertically-oriented tube, it will reach one or more ports where the liquid and gas are ejected.

There are many parameters that affect the performance of such air lifts, and even slight variations may cause dramatic changes in efficiency.

An example use of lift pumps is in fish aquaculture. The containment of fish within a tank tends to result in water with an excess concentration of dissolved $CO_2$ as compared to the normal concentration of $CO_2$ in air. For this scenario, when air is injected into the water via an airlift pump, the water will rise through the pump towards an open ejection port above the water line. As the water is ejected, it will tend to release its excess $CO_2$ as it seeks to reach equilibrium with the surrounding ambient air. At equilibrium, both the surrounding air and the total dissolved gas in the water will have generally the same percentage of $CO_2$.

Known airlift pumps are notoriously inefficient. It is not uncommon for an airlift pump to require 3 or more volumes of gas to move 1 volume of water. Due to their inefficiency, they are (relatively) rarely used for applications where it is necessary to lift a liquid or induce the liquid to flow. As a result, their most common use is as a means to adjust the relative dissolved gas concentrations in a liquid.

SUMMARY OF THE INVENTION

This disclosure describes a device for use between an injection port and a mixing chamber within an airlift pump, the device comprising: a planar plate with multiple holes extending therethrough, the holes dimensioned to direct the gas into multiple micro-streams for streaming air from the injection port into the mixing chamber.

This disclosure also describes an airlift pump comprising: an injection port for injecting pressurized air into the airlift pump; a mixing chamber with perforations, the mixing chamber coupled to the injection port for receiving air from the injection port and receiving water through the perforations; a lift tube fluidly connected to and extending from the mixing chamber an ejection port fluidly connected to and extending from the lift tube, the ejection port have a gas discharge aperture and a liquid discharge aperture; and a gas streaming device positioned between the injection port and the mixing chamber, the gas streaming device having a planar body with multiple holes extending therethrough, the holes being dimensioned to direct the gas into multiple micro-streams for streaming air from the injection port into the mixing chamber.

In general, in a first aspect, the invention relates to a device for use between an injection port and a mixing chamber within an airlift pump, the device comprising: a planar plate with multiple holes extending therethrough, the holes dimensioned to direct the gas into multiple micro-streams for streaming air from the injection port into the mixing chamber.

In one embodiment, the multiple holes are evenly spaced through the body.

In one embodiment, the multiple holes are unevenly spaced through the body.

In one embodiment, the planar body is a plate having a first face and a second face, and the holes extend from the first face to the second face.

In one embodiment, the multiple holes have diameters generally between 0.3 mm and 0.4 mm.

In one embodiment, the multiple holes have diameters generally between 0.15 and 0.25 mm.

In one embodiment, the holes are spaced 0.5 mm and 0.6 mm center to center apart from one another in a grid pattern.

In one embodiment, the holes are positioned at least 0.5 mm from a perimeter of the plate.

In one embodiment, the plate has a thickness between 12 and 13 mm.

In one embodiment, the holes in the plate contain a helical groove pattern, or rifling, to gyroscopically stabilize the gas flow as it leaves the plate.

In one embodiment, the rifling in the holes is orientated at a 30-degree angle with respect to the longitudinal axis of the hole.

In one embodiment, the planar body is composed of packed fiber.

In one embodiment, the packed fiber is oriented vertically to force the gas to flow around the packed fiber.

In one embodiment, the packed fiber is oriented horizontally to force the gas to flow around the packed fiber.

In one embodiment, the planar body comprises a printed disc.

In one embodiment, the mixing chamber is separated from the injection port in a first dimension, and wherein the multiple holes extend through the planar body in the first dimension.

In one embodiment, the holes contain a helical groove pattern to gyroscopically stabilize the gas flow as it leaves the planar body.

In one embodiment, the airlift pump includes a lift tube fluidly connected to and extending from the mixing chamber.

In one embodiment, the mixing chamber comprises perforations, the mixing chamber coupled to the injection port for receiving air from the injection port and receiving water through the perforations.

In one embodiment, the airlift pump includes an ejection port fluidly connected to and extending from the lift tube, the ejection port has a gas discharge aperture and a liquid discharge aperture.

In general, in a second aspect, the invention relates to an airlift pump comprising: an injection port for injecting pressurized air into the airlift pump; a mixing chamber; and a device positioned in use between an injection port and a mixing chamber within an airlift pump, wherein the device comprises a planar body with multiple holes extending therethrough, the multiple holes dimensioned to direct gas into multiple micro-streams for streaming the gas from the injection port into the mixing chamber, wherein the multiple holes have diameters between 0.15 mm and 0.25 mm.

In general, in a third aspect, the invention relates to an airlift pump comprising: an injection port for injecting pressurized air into the airlift pump; a mixing chamber with perforations, the mixing chamber coupled to the injection port for receiving air from the injection port and receiving water through the perforations; a lift tube fluidly connected to and extending from the mixing chamber; an ejection port fluidly connected to and extending from the lift tube, the ejection port having a gas discharge aperture and a liquid discharge aperture; and a gas streaming device positioned between the injection port and the mixing chamber, the gas streaming device having a planar body with multiple holes extending therethrough, the holes dimensioned to direct the gas into multiple micro-streams for streaming air from the injection port into the mixing chamber.

Advantages and features of the invention will become evident upon a review of the following detailed description and the appended drawings, the latter being briefly described hereinafter.

BRIEF DESCRIPTION OF THE DRAWINGS

Reference will now be made, by way of example, to the accompanying drawings, which show an example of the present application, in which:

FIGS. 5-22 show testing data when the airlift pump of FIG. 1 is used according to Testing Method 1.

FIGS. 23-26 show testing data when the airlift pump of FIG. 1 is used according to Testing Method 2.

DETAILED DESCRIPTION OF THE INVENTION

An example embodiment of an airlift pump 10, a gas streaming device 50 for streaming air into airlift pump 10, and their use will be discussed. Airlift pump 10 will first be described.

Airlift Pump.

Figure 1:
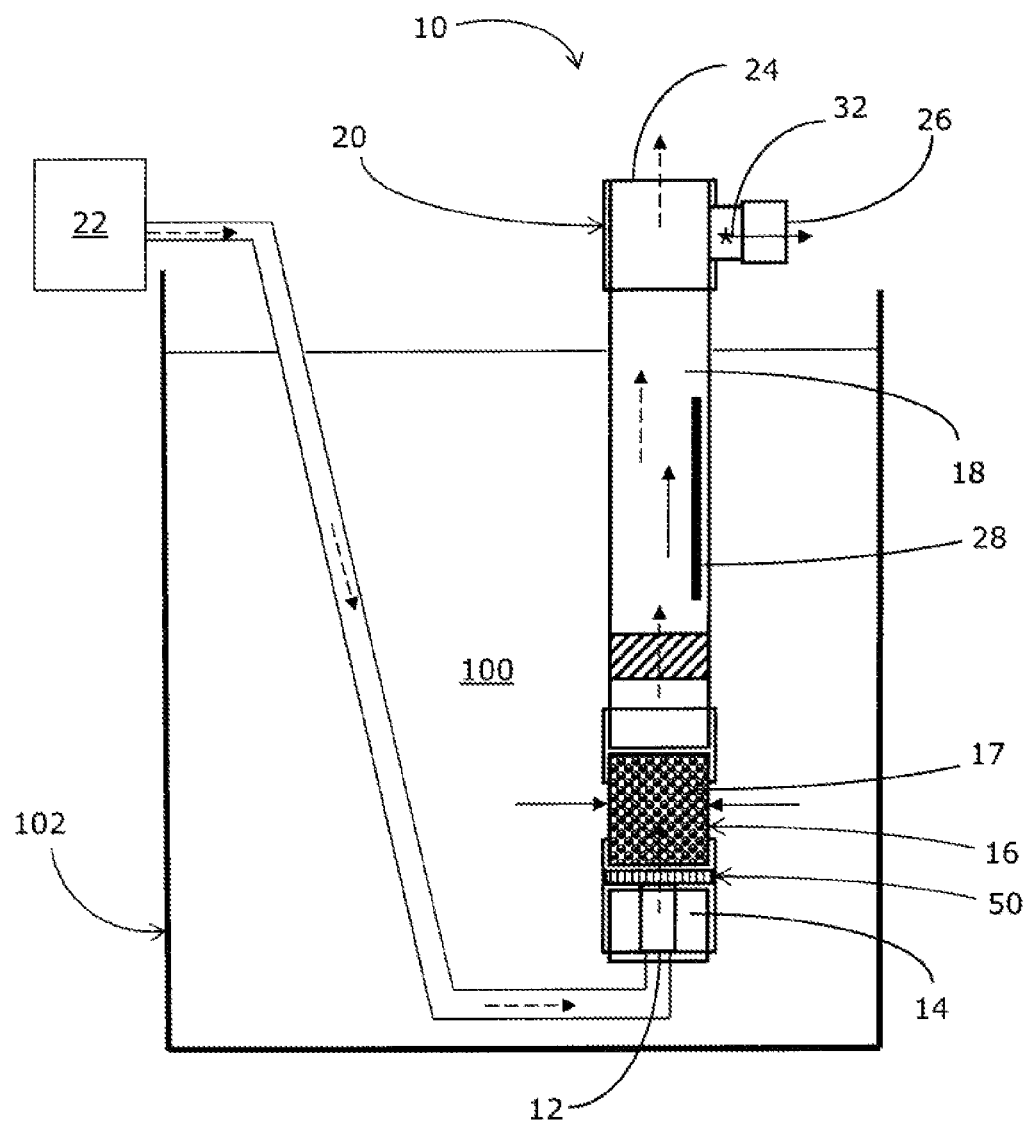
FIG. 1 is a side cross-sectional view of an airlift pump according to an example of the present invention.

As shown in FIG. 1, airlift pump 10 generally includes an injection port 12, an injection chamber 14, a mixing chamber 16, a lift tube 18, an ejection port 20, and gas streaming device 50 positioned between injection port 12 and mixing chamber 16.

Injection port 12 is positioned at one end of airlift pump 10 and is fluidly coupled to an air supply 22 and connected to injection chamber 14. As would be understood by the skilled person, the location and dimension of injection port 12 may vary. For example, an airlift pump having a 6-inch diameter may have a 2-inch diameter injection port to allow a sufficient volume of water to enter airlift pump 10 without a significant pressure drop. In another example, an airlift pump having a 1-inch diameter may have a ⅛-inch diameter injection port. As well, injection port 12 may be positioned at the bottom or on a side of one end of airlift pump 10, so long as injection port 12 is located close to the bottom of the tank to maximize lift capacity.

Injection chamber 14 is, in turn, fluidly connected to mixing chamber 16 with gas streaming device 50 positioned therebetween. As shown, gas streaming device 50 is sealed from the surrounding liquid and is orientated horizontally or laterally between injection chamber 14 and mixing chamber 16. The height of gas streaming device 50 is as small as pre-manufactured parts may permit in order to avoid positioning a large air pocket near the bottom of the tank that may cause the unit to float. The diameter of injection chamber 14 would generally correspond with the diameter of its corresponding airlift pump. For example, a 6-inch diameter airlift pump would have a 6-inch diameter injection chamber. Mixing chamber 16, as shown, is a cylindrical tube with perforations in its walls 17. The height of mixing chamber 16 may vary, but it is typically, 8-12 inches. This amounts to approximately a 6:1 ratio of airlift pump height to mixing chamber height. In alternative embodiments, however, this ratio may be different for particularly short or long lifts. Since mixing chamber 12 is where the surrounding water/liquid will be drawn into airlift pump 10, in order to maximize circulation, mixing chamber 12 is generally positioned as close to the bottom of the tank as possible.

The exact size and arrangement of the perforations may vary, in order to keep particulates and organisms out of airlift pump 10. That being said, the perforations typically form at least 60% open space for water or liquid to enter airlift pump 10.

Lift tube 18 is fluidly connected to, and extends from, mixing chamber 16.

Ejection port 20 is, in turn, fluidly connected to and extends from lift tube 18. In this manner, ejection port 20 is positioned at the opposite end of airlift pump 10, opposite injection port 12. Ejection port 20 has a gas discharge aperture 24 orientated parallel to lift tube 18, and a liquid discharge aperture 26 orientated generally perpendicular to lift tube 18. Airlift pump 10 also includes a fluid flow sensor 32 integrated into ejection port 20.

In the embodiment shown, airlift pump 10 further has a bacterial media 28 suspended within lift tube 18 or attached to the inner wall lift tube 18.

Whereas specific embodiments of an airlift pump are herein shown and described, variations are possible. In some examples, for gas streaming devices larger than 6 inches in diameter, for example, injection chamber 14 may contain a diffuser, a baffle, or other mechanical means to promote uniform flow through the face of gas streaming device 50. The positioning of one or more injection ports 12 may be another mechanical means to promote even flow through gas steaming device 50.

In other examples, rather than a single gas injection port and injection chamber, airlift pump 10 includes multiple gas injection ports proximate to the bottom of lift pump 10, which would be connected with one or more injection chambers.

In another example, airlift pump 10 would include multiple gas streaming devices, a gas flow control valve, and a following flow rate sensor. The gas flow control valve and flow rate sensors would be configured to regulate gas flow to the multiple gas streaming devices.

In another example, another fluid flow sensor would be integrated into lift tube 18.

In another example, a mechanical apparatus, such as a pump, is integrated with injection port 12 to enable adjustment and control of the gas pressure directed into injection chamber 14.

In another example, rather than having a circular cross-section throughout airlift pump 10, airlift pump 10 would have components with non-circular cross-sections.

In yet other examples, the height and/or radius of lift tube 18 may be altered to maximize the removal of gas from the liquid medium. As would be understood by the skilled person, the height and radius of lift tube 18 may be modified to accommodate different tank dimensions and air sources.

Airlift pump 10 may also be packaged and integrated with a transportable tank containing the liquid medium to be remediated by airlift pump 10.

Gas Streaming Device

Figure 3:
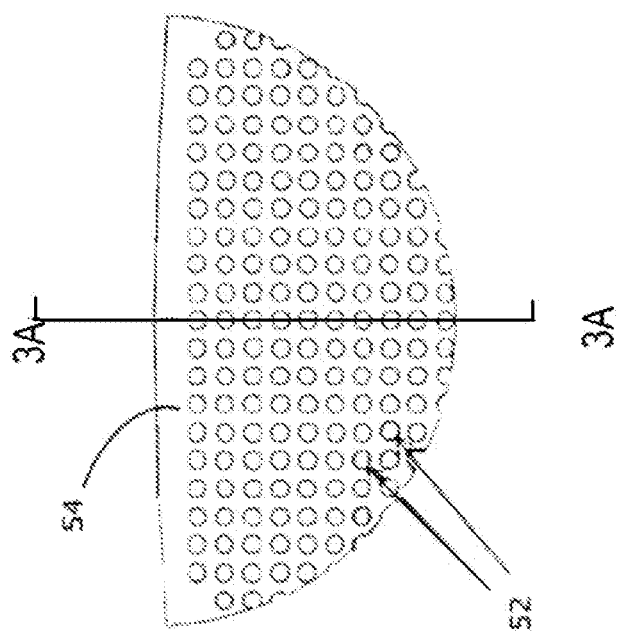
FIG. 3 is an enlarged view of portion A of the disc of FIG. 2.
Figure 2:
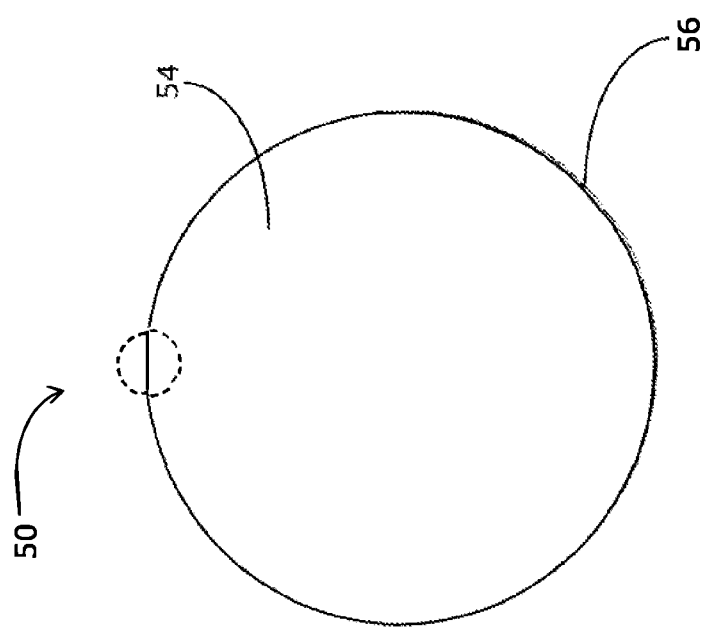
FIG. 2 is a plan view of a gas streaming device in isolation used in the lift pump of FIG. 1.

Gas streaming device 50 will now be described in detail and is shown in isolation in FIGS. 2 and 3.

Gas streaming device 50 comprises a body with multiple holes or perforations 52 having a diameter of 0.35 mm. As shown, the body is a circular plate 54 having a first face, an opposed second face, and a perimeter 56.

Plate 54 is formed from a solid hydrophobic material, which can be cleaned and sterilized. Plate 54 has a thickness of 12.7 mm.

Multiple holes 52 extend from the first face to the second face and are evenly spaced throughout plate 54. In particular, multiple holes 52 are spaced 0.55 mm, center to center, apart from one another in a grid pattern. Multiple holes 52 are also positioned at least 0.5 mm from perimeter 56 of plate 54.

Figure 3A:
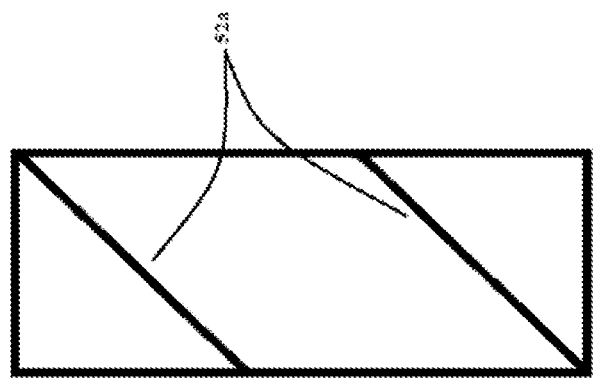
FIG. 3A is a cross-sectional view of the hole shown in FIG. 3.

As shown in FIG. 3A, multiple holes 52 in plate 54 contain a helical groove pattern or rifling 52a. In this embodiment, the rifling 52a is orientated at a 30-degree angle with respect to the longitudinal axis of each hole.

Whereas a specific embodiments of a gas streaming device is herein shown and described, variations are possible. The dimensions of perforations 52 generally do not change relative to the diameter or height of the airlift pump 10. However, in some examples, the size and configuration of perforations 52 may vary. For example, the holes or perforations 52 may have diameters generally between 0.2 mm-0.4 mm.

In other examples, multiple holes 52 are spaced 0.5 mm-0.6 mm apart, center to center, from one another in a grid pattern, and plate 54 has a thickness between 12-13 mm.

Alternately, multiple holes 52 are unevenly spaced throughout plate 102.

In other examples, rather than a solid circular plate, the body is composed of packed fiber, which may be oriented vertically and/or horizontally to force the gas to flow around the fiber. The fiber would be hydrophobic and packed within perforated plates.\

Use.

Movement of fluid through the use of airlift pump 10 is indicated by the arrows in FIG. 1. The movement of gas is indicated by dashed arrows, while the movement of water is indicated by solid arrows. As shown, air lift pump 10 is positioned within a body of water 100 in tank 102 such that injection chamber 14 and mixing chamber 16 are submerged while ejection port 20 is above the water line.

Pressurized air is injected by air supply 22 through injection port 12 and into injection chamber 14. From there, the air is directed through gas streaming device 50 into mixing chamber 16. Gas streaming device 50 forces the gas or air into multiple streams as it enters mixing chamber 16.

The diameter and spacing of multiple holes 52 in plate 54 are set to generate, uniform small gas streams at the bottom of the pump that are as vertical as possible so as to provide uniform lift. The helical groove pattern, or rifling 52a, of multiple holes 52 also helps to gyroscopically stabilize the gas flow as it leaves plate 54. These features help to minimize the merging of gas streams and to minimize the leakage of gas out of the perforated walls 17 of mixing chamber 16.

Plate 54 is also orientated horizontally within airlift pump 10. In this manner, multiple holes 52 are orientated generally parallel with the longitudinal orientation of airlift pump 10, which serves to help ensure the longest possible narrow vertical path for each gas stream as they leave plate 54. The uniformity of the gas streams helps to impart a more uniform lift to the liquid from the gas. A vertical stream is also beneficial to help prevent air streams from merging to form larger bubbles, which would provide less uniform lift.

As the streams of air enter mixing chamber 16, they mix with the water within mixing chamber 16. This mixing creates a water/air mixture that has a density that is less than the density of the water surrounding the mixing chamber 16. Due to its lower density, the water/air mixture rises through lift tube 18 towards ejection port 20.

The rising of the water/air mixture through lift tube 18 creates a vacuum or suction within mixing chamber 16. This suction simultaneously draws water from tank 102 through perforated walls 17 into mixing chamber 16. This new water, in turn, gets mixed with the entering air streams from gas streaming device 50 and is lifted through lift tube 17.

As the water/air mixture travels up through lift tube 18, it will also travel past bacterial media 28, which may react with other particles within the water/air mixture. Bacterial media 28 enables bacteria to be used to remediate targeted impurities within the liquid, such as ammonia.

As the water/air mixture reaches ejection port 20 above the water line, if the water/air mixture has a high concentration of a gas, such as $CO_2$, it will tend to release its excess $CO_2$ or other gas as it seeks to reach equilibrium with the surrounding ambient air via osmosis through gas discharge aperture 24 (and possibly through liquid discharge aperture 26). The water component would then be ejected through liquid discharge aperture 26 to return to tank 102 or to be directed to another location.

As noted above, the height and/or radius of lift tube 18 is adjusted to accommodate the depth of the surrounding liquid medium and the desired lift of the liquid medium by the pump above the water line.

Combined Use.

Airlift pump 10 may be used simultaneously with one or more saturator systems in a body of water. Saturator systems are configured to conduct a gas exchange with an aqueous-phase liquid inline with the same body of water.

In particular, the saturator systems are adapted to dissolve oxygen into the water and remove carbon dioxide, such that the overall gas pressure within the fluid is relatively unchanged. An example of such a saturator system is disclosed in U.S. 62/610,675. Each saturator system uses one or more gas infusion devices to dissolve oxygen into the water.

Each gas infusion device has a fibre module array situated between its ends where the fibre module array is made up of a polymer-coated microporous fiber material. An example of such a gas infusion device is found in U.S. Pat. No. 7,537,200, to Glassford, Oct. 31, 2003.

Used together in this manner, the saturator system oxygenates the body of water and removes carbon dioxide, while one or more airlift pumps 10 also remove the dissolved $CO_2$ and remediate the ammonia to form nitrate.

Such a combined system may further include one or more oxygen tanks connected to the saturator system for supplying oxygen to the saturator system, and a compressor coupled to airlift pumps 10 to supply ambient air to generate the lift.

Such a system may also have a gas regulator operatively coupled between the oxygen tanks and the saturator system to regulate the flow of gas into the saturator system, a dissolved oxygen sensor positioned within the body of water, a saturator feed pump in fluid communication with the body of water, adapted to draw and direct water from the body of water into the saturator system, and an ammonia sensor positioned within the body of water.

A control and monitoring system may be in place to communicate with, control, and coordinate each of the above components. For example, the compressor can be activated to engage airlift pumps 10 in response to the detected concentration of ammonia rising above a maximum level. The compressor may then be disengaged to deactivate airlift pumps 10 in response to the detected concentration of ammonia falling below a minimum level. In a similar manner, the gas regulator and the saturator feed pump may be activated and controlled in response to the detected concentration of oxygen falling below a minimum level. The gas regulator and the saturator feed pump may also be deactivated accordingly.

An advantage of the use of the present gas streaming device 50 in airlift pump 10 is that it is able to lift 3 or more unit volumes of liquid using only one unit volume of gas the same distance as a conventional lift pump. The increased efficiency may also enable airlift pump 10 to be economical in other applications where it is desirable to lift a liquid or induce flow.

The following tests were conducted to demonstrate this benefit.

Test Method 1.
  The tests were conducted using:
  Tank of water
  Source of air (pressure dependent)
  $CO_2$ source
  Method of $CO_2$ dissolution
  Airlift pump 10
  Measuring equipment ($CO_2$, temperature, salinity, pressure, air flow, water flow)

$CO_2$ was first dissolved into a body of water to the desired level in the tank using any method known in the art. Airlift pump 10 was attached to an air source with a measurable flow, and then inserted into the body of water in the tank, ensuring that ejection port 20 was above the water line, noting that the exact location would depend on the airlift pump unit.

Air is then supplied to airlift pump 10 and the air pressure within injection chamber 14 underneath gas streaming device 10 is measured to determine actual air flow.

$CO_2$ levels in the tank were recorded over the course of the experiment. The $CO_2$ levels in the tank naturally will not be homogeneous, so it was assumed that the highest $CO_2$ level in the tank was at the vacuum or suction area within mixing chamber 16 and the lowest $CO_2$ level was at liquid discharge aperture 26. An average of these two values was used to be representative of the whole tank.

The flow of water out of liquid discharge aperture 26 was measured along with the temperature and salinity of the water within the tank. These measurements were used to create a profile of the tank concentration of $CO_2$ over time, as well as the efficiency of airlift pump 10 (using the known amount of water leaving liquid discharge aperture 26 and the concentration in the tank. The instantaneous rate of change in $CO_2$ (amount removed at any given concentration) was determined by taking the derivative of the concentration over time.

Test Method 2.
  A second test method (Test Method 2), largely similar to Test Method 1, was used in situations where it was not possible to measure the water flow out of the airlift pump 10. This method involved continuously adding a known quantity of $CO_2$ to the tank while airlift pump 10 was in operation until equilibrium was achieved (i.e. the point at which the C02 being added was equal to the $CO_2$ being removed). By determining the concentration at both the top and bottom of the airlift pump 10, the flow rate of water was calculated.

The overall results are illustrated in FIGS. 4 to 26.

Figure 4:
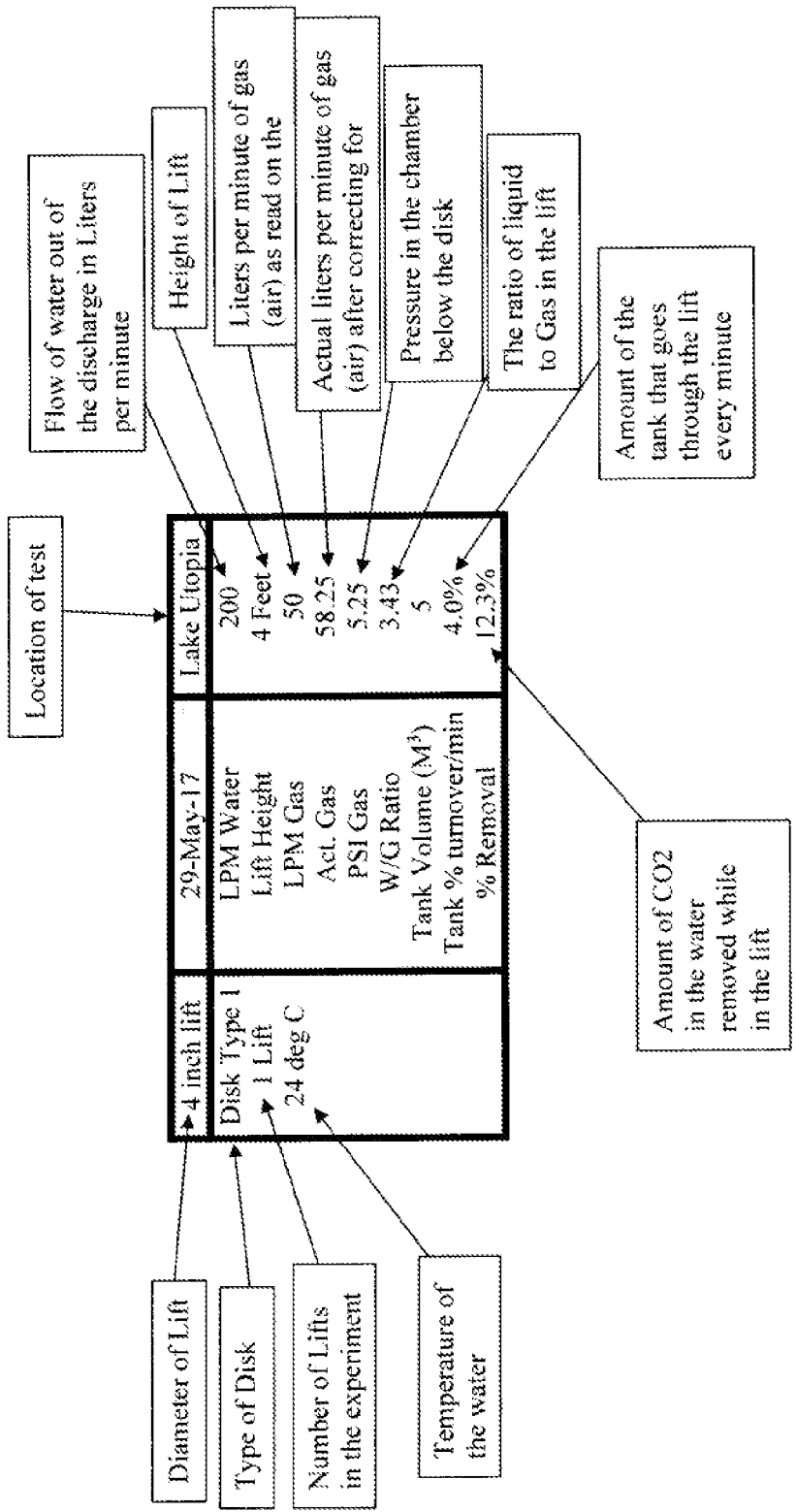
FIG. 4 is a sample table explaining the terms and units of the measurement in the subsequent Figures.
Figure 8:
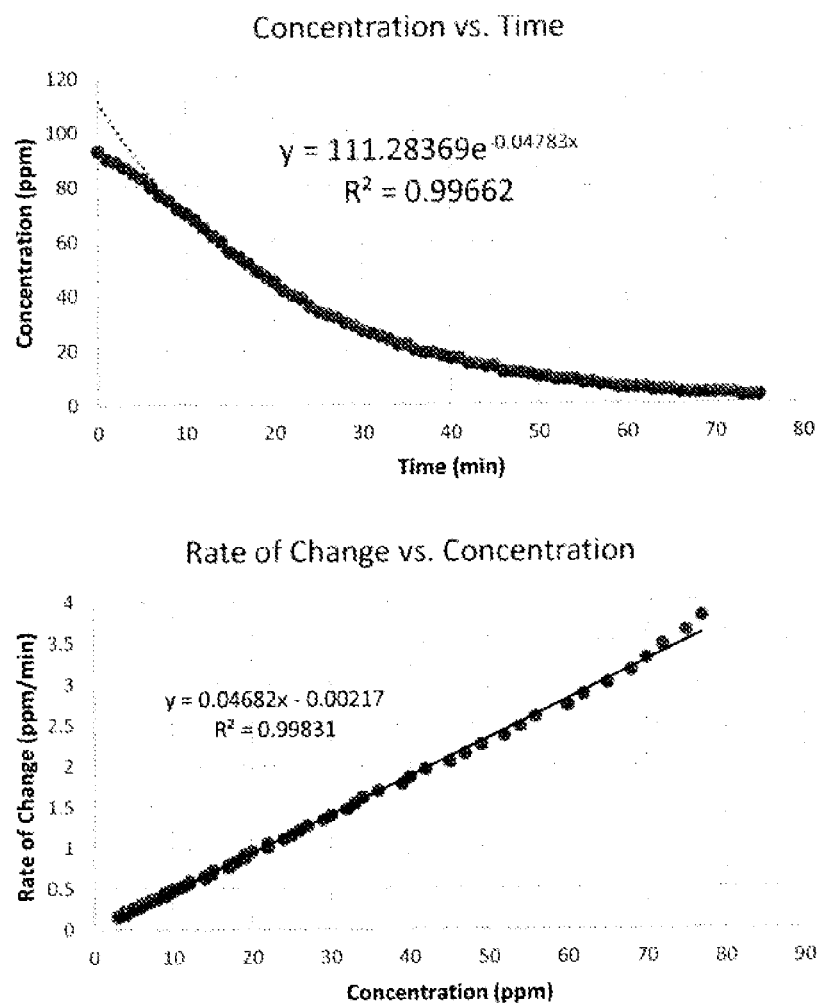
Figure 12:
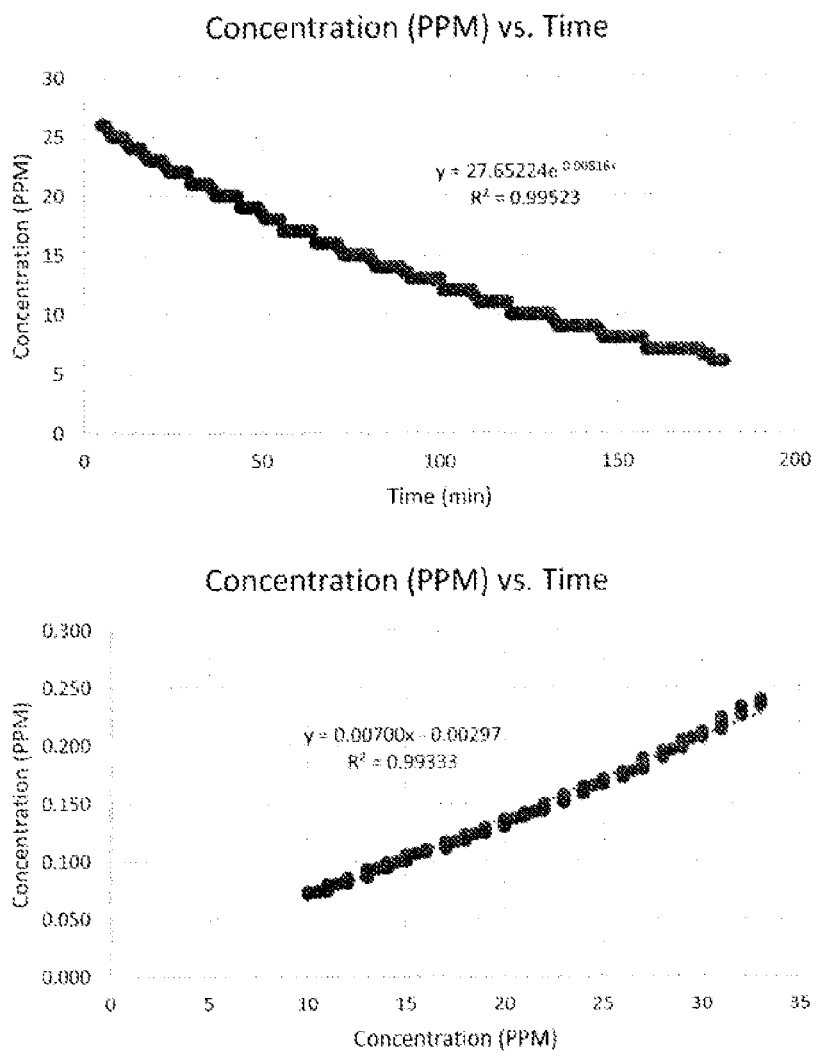

FIG. 4 is a sample table explaining the terms and units of measurement in the tables of FIGS. 5 to 26.

In FIGS. 5-14, the first graph in each Figure shows the decrease in $CO_2$ levels over the course of the trial (using Test Method 1). The second graph in each Figure shows the calculated rate of change in $CO_2$ for any concentration using the airlift pump at the parameters specified in the corresponding table. Each corresponding table shows all the fixed settings for the particular trial as well as the calculated liquid-to-gas ratio and the calculated percent removal.

Figure 16:
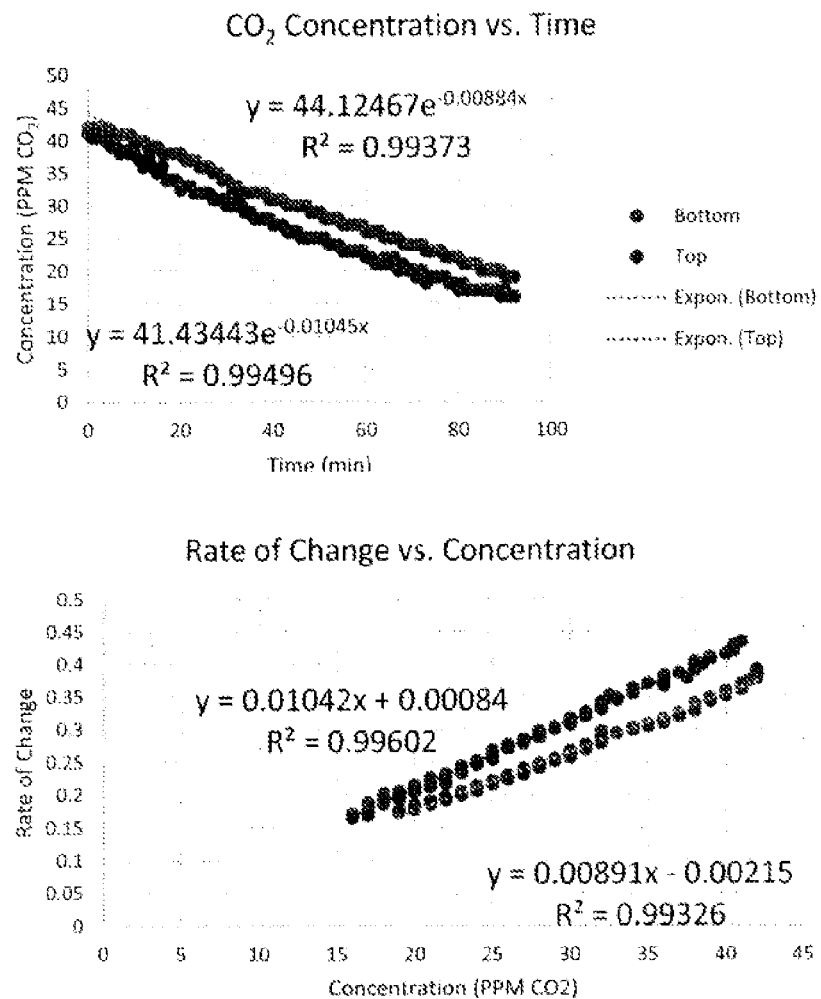
Figure 17:
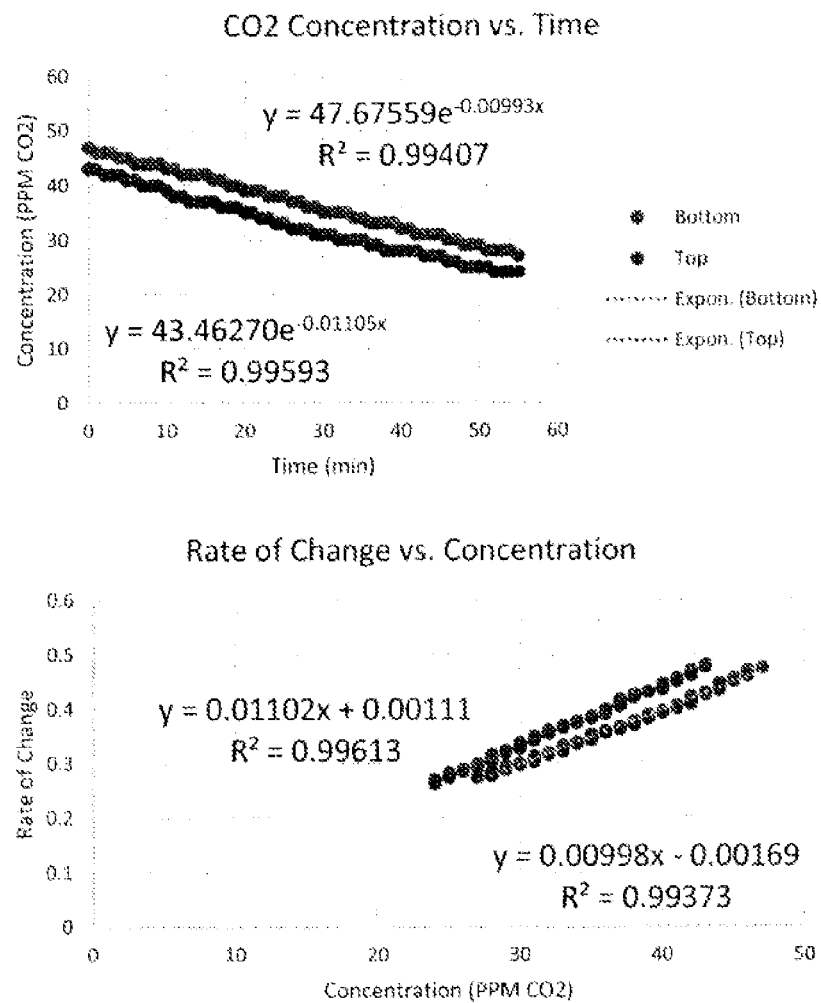

In FIGS. 15 to 17, the first graph in each Figure shows the decrease in $CO_2$ levels over the course of the trial measurements, which were taken at both the top and bottom of the lift (using Test Method 1). The second graph in each Figure shows the calculated rate of change in $CO_2$ for any concentration using the lift at the parameters specified in the corresponding table. Each table shows all the fixed settings for the respective trial as well as the calculated liquid-to-gas ratio and the calculated percent removal.

In FIG. 18, the first graph shows the decrease in $CO_2$ levels over the course of the trial (using Test Method 1). The second graph shows the calculated rate of change in $CO_2$ for any concentration using the lift at the parameters specified in the table. The table shows all the fixed settings for the trial as well as the calculated liquid-to-gas ratio and the calculated percent removal.

In FIG. 19, the first graph shows the decrease in $CO_2$ levels over the course of the trial (using Test Method 1). This is a comparison of the old and new disc (or gas streaming device) styles and shows little difference in performance at the given levels.

The old disc style was a "disc" that consisted of numerous hydrophobic hollow fibers held in place with epoxy to generate a similar effect as the gas streaming device 50. However, the holes in the old disc were not always uniform or straight, or even always open, which naturally caused a drop in the efficiency and quality of gas diffusion.

The second graph shows the calculated rate of change in $CO_2$ for any concentration using the airlift pump at the parameters specified in the table. The table shows all the fixed settings for the trial as well as the calculated liquid-to-gas ratio and the calculated percent removal.

In FIGS. 20 to 22, the first graph in each Figure shows the decrease in $CO_2$ levels over the course of the trial (using Test Method 1). The second graph in each Figure shows the calculated rate of change in $CO_2$ for any concentration using the lift at the parameters specified in the table. The table shows all the fixed settings for the trial as well as the calculated liquid-to-gas ratio and the calculated percent removal.

In FIGS. 23 to 26, each table is representative of a trial (using Test Method 2) and shows all the fixed settings as well as the calculated water flow rate, the calculated liquid-to-gas ratio, and the calculated percent removal rate.

As shown in FIGS. 5-14, 18-9, which used Disc type 1, the data generally demonstrates that airlift pump 10 works in various conditions and setups. Disc type 1 is gas streaming device 50 that is composed of packed fiber, which may be oriented vertically and/or horizontally to force the gas to flow around the fiber.

As shown in FIGS. 15-17 and 19-22, which used Disc type 2, the data generally shows that, while similar to the results for Disc type 1, there is a small improvement in efficiency at a lower pressure. Disc type 2 is the first printed disc with the same nominal dimension and spacing as the fiber disc of Disc type 1.

FIGS. 23-26 illustrate data generated when using Disc types 3, 4, and 5. The hole and spacing sizes of Disc types 3-5 are smaller than that of Disc type 2. In particular, for Disk type 3, the holes were between 0.3 and 0.4 mm and the pinch was between 0.45 and 0.55 mm. For Disk type 4, the holes were between 0.15 and 0.25 mm and the pinch was between 0.35 and 0.45 mm. For Disk type 5, the holes were between 0.175 and 0.225 mm and the pinch was between 0.25 and 0.35 mm.

The data indicates that the smaller holes with smaller spacing produce better results at lower pressures since smaller bubbles are produced and the overall area of open space increases.

Accordingly, it is shown that the present invention is able to lift 3 or more unit volumes of liquid using only one unit volume of gas the same distance as a conventional lift pump.

Whereas a specific embodiment of the method is herein shown and described, variations are possible.

Accordingly, the invention should be understood to be limited only by the accompanying claims, purposively construed.

The invention claimed is:

1. An airlift pump comprising: an injection port for injecting pressurized air into the airlift pump; a mixing chamber; and a device positioned between the injection port and the mixing chamber within the airlift pump, wherein the device comprises a planar body with multiple holes extending therethrough, the multiple holes dimensioned to direct gas into multiple micro-streams for streaming the gas from the injection port into the mixing chamber configured to create a gas-liquid mixture which results in displacing a volume of liquid within the airlift pump, wherein: the planar body is a plate having a first face and a second face, and the multiple holes extend from the first face to the second face, and the multiple holes are positioned at least 0.5 mm from a perimeter of the plate, the perimeter adjacent an inner surface of the mixing chamber; wherein the planar body is composed of packed fiber and wherein the packed fiber is oriented vertically to force the gas to flow around the packed fiber.

2. The airlift pump of claim 1, wherein the multiple holes are evenly spaced through the planar body.

3. The airlift pump of claim 1, wherein the multiple holes are unevenly spaced through the planar body.

4. The airlift pump of claim 1, wherein the multiple holes have diameters generally between 0.3 mm and 0.4 mm.

5. The airlift pump of claim 1, wherein the multiple holes have diameters generally between 0.15 and 0.25 mm.

6. The airlift pump of claim 4, wherein the multiple holes are spaced 0. 5 mm and 0.6 mm center to center apart from one another in a grid pattern.

7. The airlift pump of claim 1, wherein the plate has a thickness between 12 and 13 mm.

8. The airlift pump of claim 7, wherein the multiple holes in the plate contain a helical groove pattern to gyroscopically stabilize flow of the gas flew as the gas leaves the plate.

9. The airlift pump of claim 8, wherein the helical groove pattern in the multiple holes is orientated at a 30-degree angle with respect to the longitudinal axis of the holes.

10. The airlift pump of claim 1, wherein the planar body comprises a printed disc.

11. The airlift pump of claim 1, wherein the mixing chamber is separated from the injection port in a first dimension, and wherein the multiple holes extend through the planar body in the first dimension.

12. The airlift pump of claim 1, wherein the multiple holes contain a helical groove pattern to gyroscopically stabilize flow of the gas flew as the gas leaves the planar body.

13. The airlift pump of claim 1, comprising a lift tube fluidly connected to and extending from the mixing chamber.

14. The airlift pump of claim 1, wherein the mixing chamber comprises perforations, the mixing chamber coupled to the injection port for receiving air from the injection port and receiving water through the perforations.

15. The airlift pump of claim 1, comprising an ejection port fluidly connected to and extending from the lift tube, the ejection port comprises a gas discharge aperture and a liquid discharge aperture.

16. An airlift pump comprising: an injection port for injecting pressurized air into the airlift pump; a mixing chamber; and a device positioned in use between an injection port and a mixing chamber within an airlift pump, wherein the device comprises a planar body with multiple holes extending therethrough, the multiple holes dimensioned to direct gas into multiple micro-streams for streaming the gas from the injection port into the mixing chamber configured to create a gas-liquid mixture which results in displacing a volume of liquid within the airlift pump, wherein the multiple holes have diameters between 0.15 mm and 0.25 mm, wherein the planar body is a plate having a first face and a second face, and the multiple holes extend from the first face to the second face, wherein the multiple holes are positioned at least 0.5 mm from a perimeter of the plate, the perimeter adjacent an inner surface of the mixing chamber; wherein the planar body is composed of packed fiber and wherein the packed fiber is oriented vertically to force the gas to flow around the packed fiber.

17. An airlift pump comprising: an injection port for injecting pressurized air into the airlift pump; a mixing chamber with perforations, the mixing chamber coupled to the injection port for receiving air from the injection port and receiving water through the perforations; a lift tube fluidly connected to and extending from the mixing chamber; an ejection port fluidly connected to and extending from the lift tube, the ejection port comprises a gas discharge aperture and a liquid discharge aperture; and a gas streaming device positioned between the injection port and the mixing chamber, the gas streaming device comprises a planar body with multiple holes extending therethrough, the holes dimensioned to direct gas into multiple micro-streams for streaming air from the injection port into the mixing chamber configured to create a gas-liquid mixture which results in displacing a volume of liquid within the airlift pump, wherein the planar body is a plate having a first face and a second face, and the multiple holes extend from the first face to the second face, wherein the multiple holes are positioned at least 0.5 mm from a perimeter of the plate, the perimeter adjacent an inner surface of the mixing chamber; wherein the planar body is composed of packed fiber and wherein the packed fiber is oriented vertically to force the gas to flow around the packed fiber.

* * * * *